United States Patent [19]

Gotanda et al.

[11] Patent Number: 5,042,871

[45] Date of Patent: Aug. 27, 1991

[54] GLASS PANE FOR USE IN A VEHICLE

[75] Inventors: Terutsugu Gotanda, Kariya; Shinji Takeda, Toyota; Isao Fugawa, Nishio; Keiichi Kano; Hideo Yano, both of Nagoya; Tatuo Shimada, Kariya, all of Japan

[73] Assignee: Aisin Seiki Kabushiki Kaisha, Kariya, Japan

[21] Appl. No.: 608,021

[22] Filed: Nov. 2, 1990

Related U.S. Application Data

[63] Continuation of Ser. No. 281,402, Dec. 8, 1988, abandoned.

[30] Foreign Application Priority Data

Dec. 8, 1987 [JP] Japan ............................... 62-310477

[51] Int. Cl.$^5$ ................................................ B60J 1/02
[52] U.S. Cl. ..................................................... 296/201
[58] Field of Search ................................ 296/201, 216

[56] References Cited

U.S. PATENT DOCUMENTS 4,219,230 8/1980 Lapine ................................. 296/216
4,571,278 2/1986 Kunert ............................. 296/201 X
4,773,700 9/1988 Sannomiya ..................... 296/201 X

FOREIGN PATENT DOCUMENTS 39315 2/1987 Japan ................................... 296/201

Primary Examiner—Margaret A. Focarino
Assistant Examiner—Joseph D. Pape
Attorney, Agent, or Firm—Oblon, Spivak, McClelland, Maier & Neustadt

[57] ABSTRACT

A glass pane for use in a vehicle is composed of a main portion held by a frame provided at a portion of a body of the vehicle and an organic paint coated on an inside-periphery of the glass. The coated organic paint on the glass serves for concealing an inside of the vehicle from the outside thereof.

2 Claims, 3 Drawing Sheets

GLASS PANE FOR USE IN A VEHICLE

BACKGROUND OF THE INVENTION

1. Field of the Invention

The present invention relates to a glass pane for use in a vehicle.

2. Discussion of the Related Art

Conventionally, such a glass pane is held in a frame secured to a portion of a body of the vehicle. In order to provide the mechanical connection with fluid-tightness between the frame and the body, some parts or components are arranged inside of a periphery of the frame. Such parts or components have to be concealed from the exterior of the vehicle for aesthetic reasons. As a known concealing means, a ceramic is coated on the inside-peripheral portion of the glass.

For the ceramic-coating, the ceramic must be fired at high temperatures of about 600°-700° C. before being coated on the glass. This means that such operation is very cumbersome and requires complex machinery.

SUMMARY OF THE INVENTION

It is therefore a principal object of the present invention to provide a glass pane for use in a vehicle without the aforementioned drawbacks.

Another object of the present invention is to provide a glass pane for use in a vehicle having a concealing means has good adhesive strength.

To achieve the objects and in accordance with the purposes of the present invention, a glass pane for use in a vehicle is comprised of a main portion held by a frame provided at a portion of a body of the vehicle, and an organic paint coated on an inside-periphery of the main portion.

BRIEF DESCRIPTION OF THE DRAWINGS

The above and other objects, features and advantages of the present invention will become apparent and more readily appreciated from the following detailed description of preferred exemplary embodiments of the present invention, taken in connection with the accompanying drawings, in which.

DETAILED DESCRIPTION OF THE PREFERRED EMBODIMENTS

Figure 1:
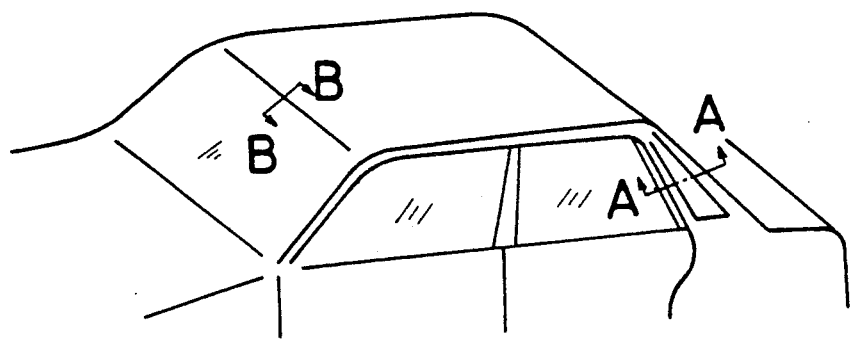
FIG. 1 is a perspective view of a body of a vehicle body.
Figure 2:
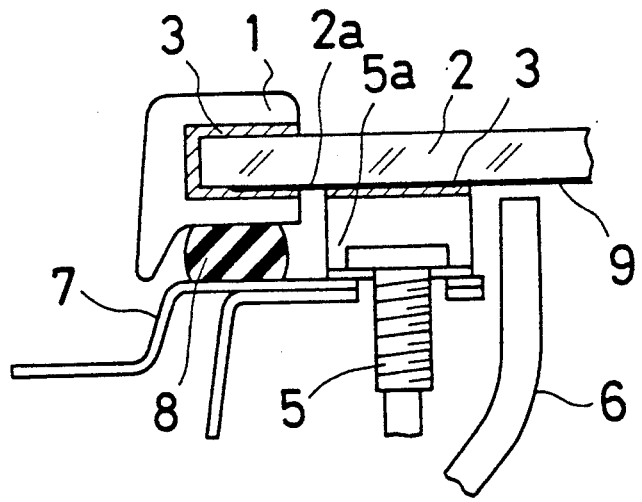
FIG. 2 is a cross-sectional view of a first embodiment of a quarter-window corresponding to the cross-section taken along line A—A in FIG. 1.

Referring now to FIGS. 1 and 2, a main portion 2 of a quarter-glass window is held in a frame or molding 1 by adhesive agent 3. A sealing member 8 such as an elastomeric material is disposed between a vehicle body 7 and the frame 1 to water-proof the joint therebetween. For concealing a distal end of the vehicle body 7, a connecting means 5 (e.g., a bolt), and a trim 6 from the exterior of the main portion 2, an organic paint 9 is coated on an inside-periphery 2a of the main portion 2.

The organic paint 9 includes a main agent and a hardening agent both of which are liquid. As the main agent and the hardening agent, water-soluble acryls and coupling agents of inorganic-silanes are respectively employed. The ratio therebetween is 70:30 by weight percent.

Figure 6:
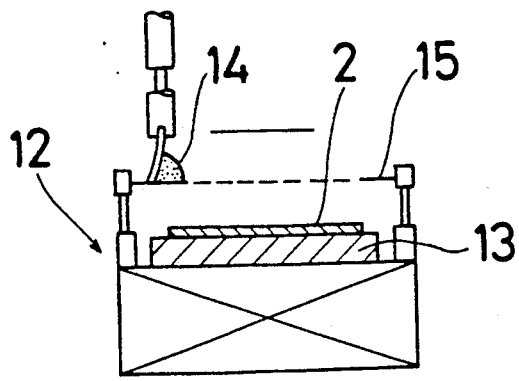
FIG. 6 is a schematic view illustrating a screen printing apparatus.

For coating the organic paint 9 on the main portion 2, a screen printing method is preferably employed. A schematic illustration of an apparatus 12 for screen printing is shown in FIG. 6. Under the shown conditions, the main portion 2 is installed on a base 13 and is printed with an amount of ink 14 which is a preliminary form of the organic paint 9, via a masking screen 15.

Figure 7:
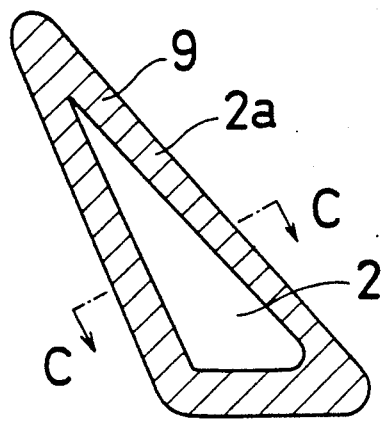
FIG. 7 is a plan view of a glass to which an organic paint is coated.
Figure 8:
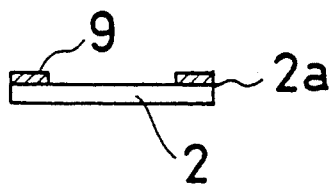
FIG. 8 is a cross-sectional view taken along line C—C in FIG. 7.

As a result of this screen printing, a layer of acrylic paint 9 with a thickness of 5-8 μm is formed on a periphery 2a of the main portion 2 as shown in FIGS. 7 and 8.

It is instead possible to obtain a layer of acrylic paint 9 with a thickness of 15-25 μm on the periphery 2a of the main portion 2 by spraying the ink 14 which is diluted by 70-90 cps with an alcohol based liquid.

Figure 3:
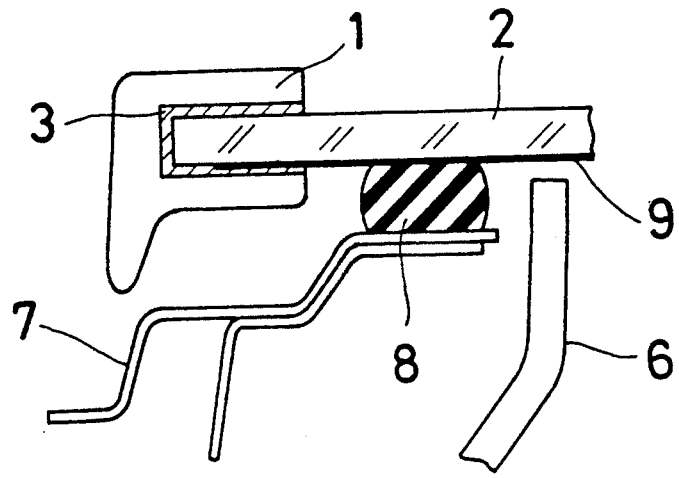
FIG. 3 is a cross-sectional view of a second embodiment of a quarter-window corresponding to the cross-section taken along line A—A in FIG. 1.

FIG. 3 shows a second embodiment of the quarter-window similar to one shown in FIG. 2 except that the sealing member 8 is disposed between the main portion 2 and the distal end portion of the body 7 (the connecting means is not shown).

Figure 4:
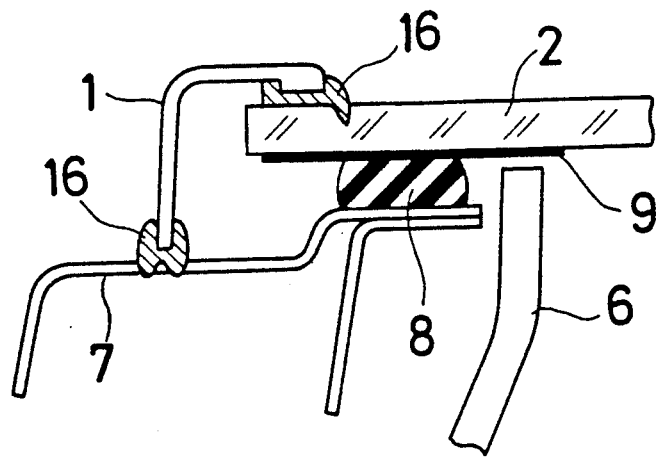
FIG. 4 is a cross-sectional view of a third embodiment of a quarter-window corresponding to the cross-section taken along line A—A in FIG. 1.

FIG. 4 shows a third embodiment of the quarter-window in which the frame 1 is of L-shape and the opposite ends are provided with elastic pads 16 and 16.

Figure 5:
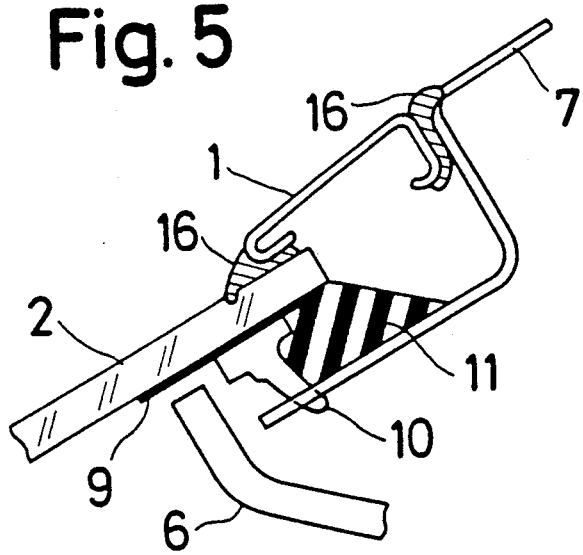
FIG. 5 is a cross-sectional view of a front window corresponding to the cross-section taken along line B—B in FIG. 1.

The main portion 2 to which the organic paint 9 is coated may instead be a front glass as shown in FIG. 5 wherein numeral 10 denotes a retainer element secured to the main portion and numeral 11 denotes a sealing member.

Figure 9:
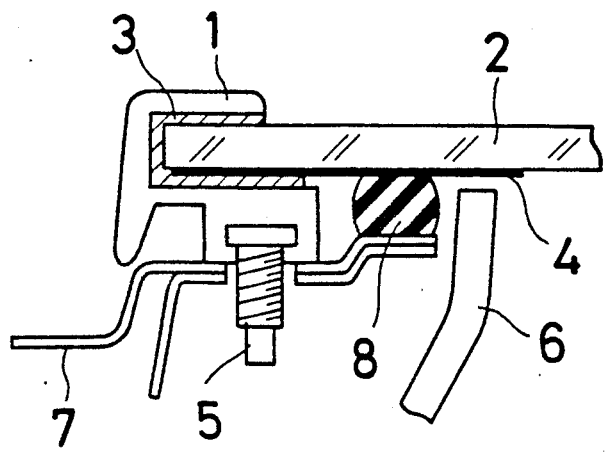
FIG. 9 is a view corresponding to FIG. 3 but showing an alternate connecting means.

The connecting means 5 such as a bolt can be fixed to the main portion 2 via an adhesion agent 3 used to adhere the connecting piece 5a of the connecting means to the painted surface 2a of the main portion, as shown in FIG. 2. Alternatively (FIG. 9), the frame 1 can fit over the head of the bolt and be held thereby, with the sealing member 8 disposed as in FIG. 3.

The following results, effects or merits are obtained by coating the organic paint 9 on the main portion 2 as mentioned above in comparison with the conventional technique.

(1) No complicated apparatus is required for the coating on the main portion.

(2) Various paint colors are available to match the vehicle body 7.

(3) The connection between organic paint 9 and the main portion 2 is very strong due to the bonding of the hardening agent to the Si-OH in the main portion 2.

(4) Both the screen printing method and the spraying method are available.

(5) The organic paint 9 is so compatible with the adhesive agents that a compound such as a sealing member made of elastic resin may be interposed therebetween.

(6) Various patterns may be coated on the main portion of the glass.

While the invention has been particularly shown and described with reference to preferred embodiments thereof, it will be understood that those skilled in the art that the foregoing and other changes in form and details can be made therein without departing from the spirit and scope of the invention.

What is claimed as new and desired to be secured by Letters Patent of the United States is:

1. A glass pane for use in a vehicle, comprising:
   a main portion to be held by a frame provided at a portion of a body of said vehicle; and
   an organic paint coated on a periphery of a surface of said glass pane at said main portion, said surface being an inside surface when said main portion is held by a vehicle frame, wherein said organic paint includes a main agent in the form of an acryl having a solubility property, and an organic silane hardening agent,
   wherein said main agent and said hardening agent are combined with a ratio of 70:30 by weight percent.

2. A glass pane for use in a vehicle according to claim 1 wherein said organic paint has a thickness of 5–8 μm.

* * * * *